No. 629,363. Patented July 25, 1899.
H. F. HOBEL.
ACCUMULATOR PLATE.
(Application filed Jan. 31, 1899.)

(Specimens.)

WITNESSES:
Ella L. Giler
Oldminsk

INVENTOR
Heinrich Franz Hobel
BY
Richardson
ATTORNEYS

THE NORRIS PETERS CO., PHOTO-LITHO., WASHINGTON, D. C.

UNITED STATES PATENT OFFICE.

HEINRICH FRANZ HOBEL, OF BERLIN, GERMANY, ASSIGNOR TO THE ACCUMULATOREN UND ELECTRICITÄTS-WERKE ACTIENGESELLSCHAFT, VORMALS W. A. BOESE & CO., OF SAME PLACE.

ACCUMULATOR-PLATE.

SPECIFICATION forming part of Letters Patent No. 629,363, dated July 25, 1899.

Application filed January 31, 1899. Serial No. 704,033. (Specimens.)

*To all whom it may concern:*

Be it known that I, HEINRICH FRANZ HOBEL, a subject of the Emperor of Austria-Hungary, residing at the city of Berlin, in the Kingdom of Prussia, German Empire, have made a new and useful Improvement in Accumulator-Plates, of which the following is a specification.

This invention relates to electrode-plates for electric accumulators having as large a lead surface as possible and a very effective arrangement of the active mass or paste, with a good circulation of the electrolyte.

The object of the invention is shown in the accompanying drawings.

Figure 1:
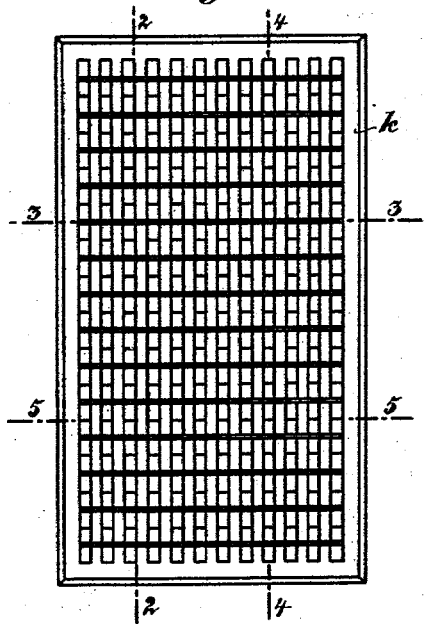
Figure 2:
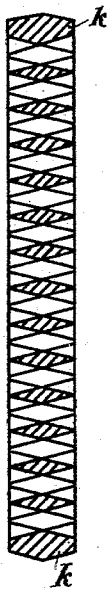
Figure 4:
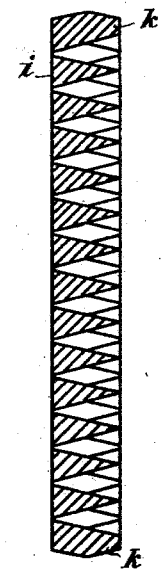
Figure 3:
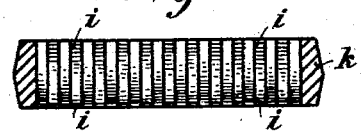
Figure 5:
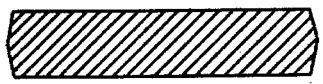
Figure 6:
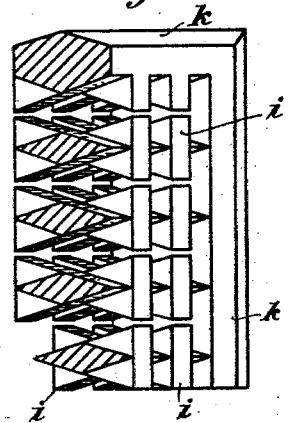

Figure 1 is an elevation of the improved grid or latticed plate; Fig. 2, a section on the line 2 2 of Fig. 1; Fig. 3, a section on the line 3 3 of Fig. 1; Fig. 4, a section on the line 4 4 of Fig. 1; Fig. 5, a section on the line 5 5 of Fig. 1, and Fig. 6 a perspective view.

The basic idea of this improved electrode-plate consists in a large number of small flat formations having a triangular shape being arranged in layers alternately one on the other in such a way that the points of one layer correspond to the bases of the two adjacent layers. These electrode-plates are not, however, made by arranging the separate formations upon and opposite one another in layers, but by casting.

In the form of construction shown in Figs. 1 to 5, in which the formations represent equilateral triangles *i*, the latter are laid side by side in such a way that the point of one triangle points to the base of the triangle lying next to it. Rows formed in this way are arranged one above the other in a frame *k*. By the arrangement side by side of the triangles *i* hereinbefore mentioned the result is attained that not only their points, but also their bases, are kept apart, so that the active mass passes from one side to the other. Further, in consequence of this arrangement solid bars are formed passing through from one side of the framework to the other completely. These solid bars, which in cross-section have the form of an elongated rhombus, are provided with projections or lugs on both sides, which alternately, according to the triangular form, widen outwardly on the one side and on the other side taper outwardly to a point. Between these flaps the active mass is placed. The active mass also forms bars, which pass from one side of the frame to the other and on which also projections are formed when the active mass is spread between the formations *i*.

In the manner hereinbefore described a grid or latticed plate is thus obtained which has a very large surface and is also equally suitable for forming according to the Planté or Faure system. The plate hereinbefore described is, however, especially suitable for the purpose of being arranged according to the formation of Faure, and later, during the period of working, being also utilized according to Planté. If after a long period of working the active mass becomes loose and partly falls out, the lead grid or latticed plate of larger surface which has been formed in the meantime with it can be further utilized by Planté's method without a deleterious change being observable in the capacity of the plates. The separate parts of the latticed plates are so connected that, on the one hand, a thoroughly reliable stability and, on the other hand, a good circulation of the electrolyte is attained.

I claim—

1. Electrode-plates for electric accumulators, characterized by a large number of small flat formations having a triangular shape being placed alternately with their flat sides to one another in such a way that the points correspond to a similar position of the bases of the next layer, when placed side by side and affording a latticed work or grid of large surface composed of several columns thus formed and perforated in an oblique direction so that solid bars pass through from one side of the frame to the opposite one both in the latticed work and also in the active mass after it has been spread over said latticed work, substantially as hereinbefore set forth.

2. An electrode-plate consisting of bars each formed of a series of integrally-united triangular formations arranged with their apexes alternately at the upper and lower sides of the bars leaving diamond-shaped openings between the bars, substantially as described.

In witness whereof I have hereunto set my hand in presence of two witnesses.

HEINRICH FRANZ HOBEL.

Witnesses:
WOLDEMAR HAUPT,
ERURIC L. GOLDSCHMIDT.